J. I. McFARLAND.
TRANSPORTABLE ADJUSTABLE AUTOMOBILE RACK.
APPLICATION FILED APR. 4, 1918.
1,290,267.
Patented Jan. 7, 1919.
2 SHEETS—SHEET 1.
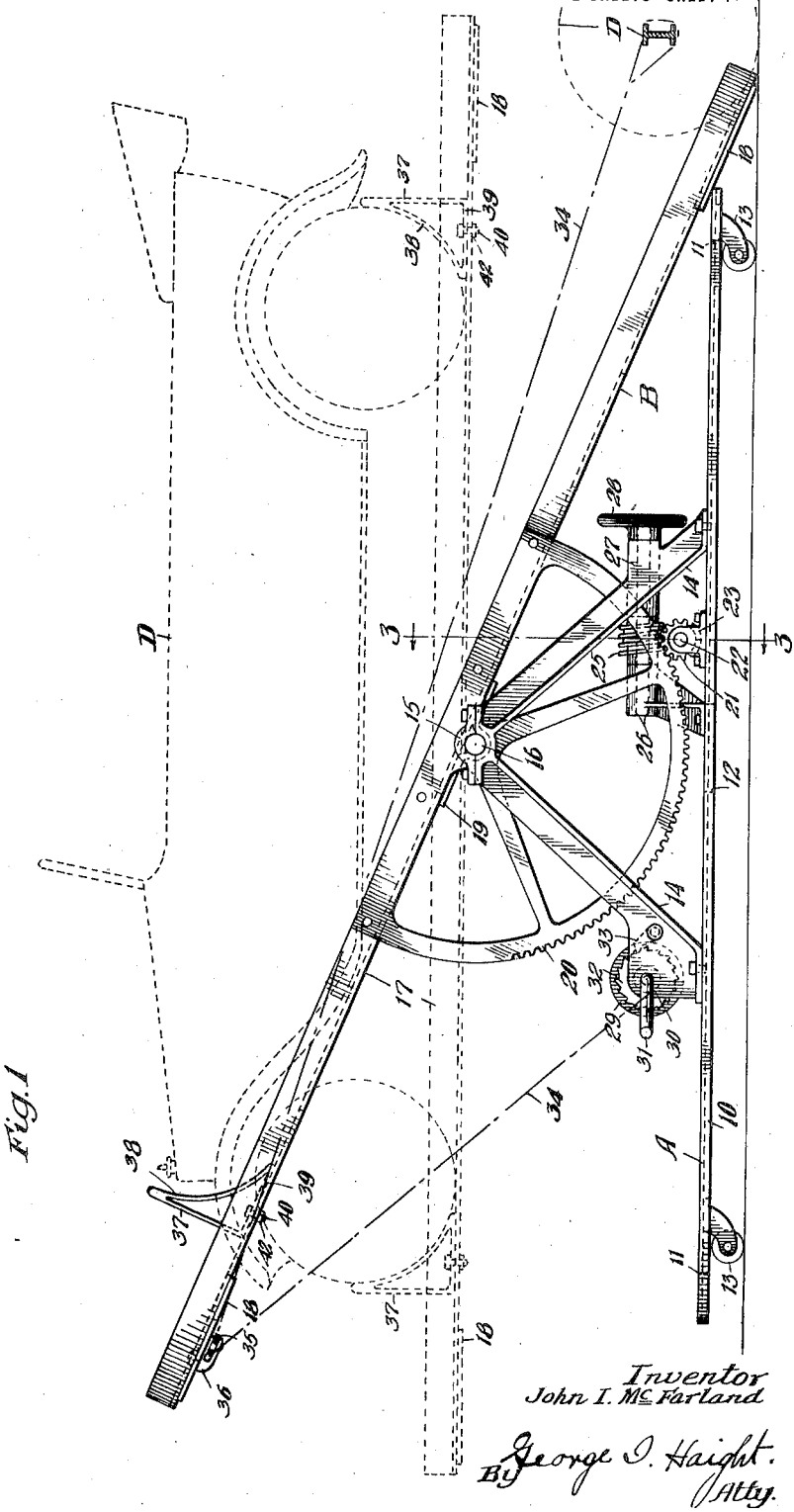
Inventor
John I. McFarland
By George I. Haight.
Atty.

J. I. McFARLAND.
TRANSPORTABLE ADJUSTABLE AUTOMOBILE RACK.
APPLICATION FILED APR. 4, 1918.
1,290,267.
Patented Jan. 7, 1919.
2 SHEETS—SHEET 2.
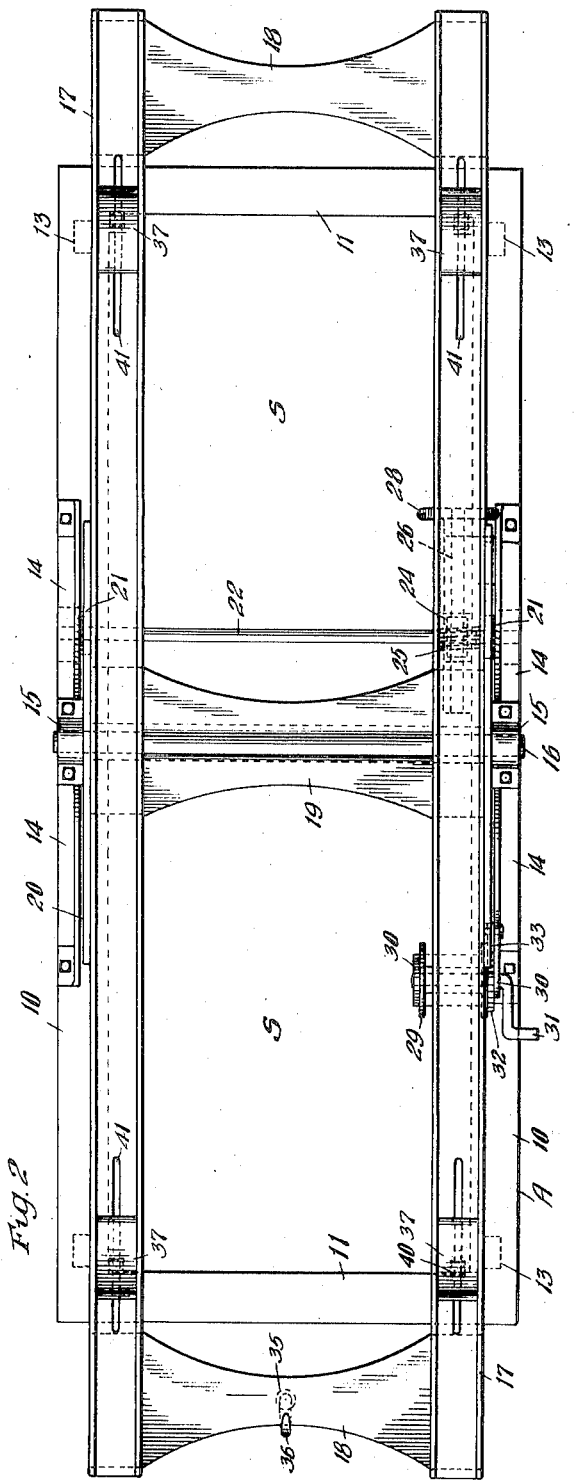
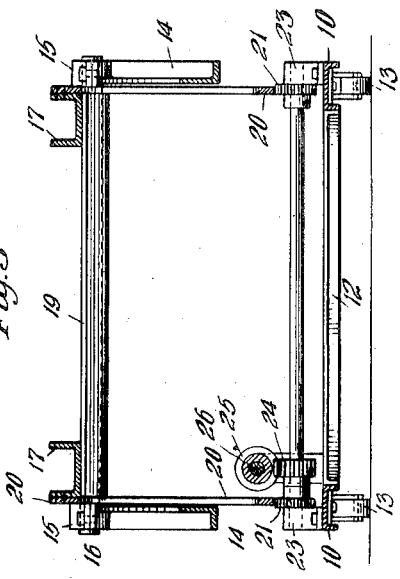
Inventor
John I. McFarland
By George C. Haight
Atty

UNITED STATES PATENT OFFICE.

JOHN I. McFARLAND, OF LODI, WISCONSIN.

TRANSPORTABLE ADJUSTABLE AUTOMOBILE-RACK.

1,290,267.   Specification of Letters Patent.   Patented Jan. 7, 1919.

Application filed April 4, 1918. Serial No. 226,757.

*To all whom it may concern:*

Be it known that I, JOHN I. MCFARLAND, a citizen of the United States, residing at Lodi, in the county of Columbia and State of Wisconsin, have invented a certain new and useful Improvement in Transportable Adjustable Automobile-Racks, of which the following is a full, clear, concise, and exact description, reference being had to the accompanying drawings, forming a part of this specification.

This invention relates to improvements in transportable adjustable automobile racks.

One object of the invention is to provide a rack suitable for use in automobile assembling plants, garages, automobile paint and repair shops, etc., which rack is so designed that the automobile or other vehicle may be readily positioned on a tilting platform carried by a transportable frame so that, the entire device with the automobile may be readily shifted to any desired position and the platform tilted so as to render accessible any underneath portion of the automobile.

Another object of the invention is to provide a device of the character indicated so arranged that the platform by which the automobile or other vehicle is carried can be tilted or elevated in such a way that the under side of either end of the automobile will be disposed in such a position and at such a height as to be readily accessible to the workmen without necessity of the latter having to stoop or assume an awkward position.

As is well known, when it is necessary to inspect or repair automobiles, particularly in garages, it is customary to either run the automobile over a pit or for the workman to use a very low wooden rack on which he can lie and then work himself under the automobile. Both of these methods are exceedingly objectionable for the reasons that they require the workman to work in cramped and exceedingly difficult positions and also generally prevent the positioning of the automobile at such a place in the garage as to obtain good lighting effects. With my improvements, the automobile may be taken to any part of the garage where the best light effects are obtained and the workmen permitted to work in a comfortable normal position.

In the drawing forming part of this specification, Figure 1 is an elevational view of an automobile rack embodying my improvements, the full lines indicating the position of the platform when it is ready to receive the automobile and the dotted lines indicating the horizontal position of the platform with an automobile positioned thereon. Fig. 2 is a top plan view of the rack. And Fig. 3 is a vertical, transverse, sectional view, taken on the line 3—3 of Fig. 2.

As shown in said drawing, the improved device includes a framework or supporting base A, and a tilting table or platform B mounted on the base A, together with suitable gearing, tackle, and other detailed features, hereinafter specifically described.

The base or frame A is of substantially rectangular form having side members 10—10 connected by end cross pieces 11—11 and a central cross bar 12. The frame may be constructed of any suitable material possessing the necessary strength and rigidity, such as angle irons, channels, Z-bars, etc. One of the essential features is that the framework shall be left open so as to permit the workmen or operator to step within the frame without interference.

The frame A is mounted on suitable roller casters 13—13 so that the entire device may be readily shifted from one place to another in the garage, assembling plant or other place where employed.

On each side of the frame and at the center thereof, are provided angularly arranged supports 14—14, the same meeting at the top and providing bearings 15 for a transverse shaft or axle 16 which carries the tilting table B. As will be understood, the supporting members 14 may also be of any suitable structural formation, such as plates, angles, etc.

The tilting table B, as shown, consists of two channel-shaped side tracks 17—17 spaced apart a distance corresponding to the usual gage of the wheels of an automobile, truck or the like, said tracks being arranged to permit the wheels to run therein and thereby prevent accidental lateral or transverse movement of the automobile while on the platform. The tracks 17 are connected at their ends by suitable cross bracing bars or plates 18—18 and also preferably at the middle, as indicated at 19. This forms a rigid construction, all the parts of which are suitably tied together and at the same time, it will be noted that the platform is open so as to permit the workmen to maneuver in the large spaces designated generally by the reference letters S—S. The length of the tilting platform B is preferably made such that when it is tilted to the maximum permissible degree, the ends of the platform will approximately touch the floor beyond the ends of the supporting frame or base A, as clearly indicated in Fig. 1, to thereby facilitate the pulling of the automobile D up onto the platform.

In order to manipulate the platform and tilt it to the desired amount, said platform is provided on each side thereof within the supporting standards 14—14 with substantially semi-circular racks 20—20, the center of which coincides with the center of the shaft 16. Coöperable with the semi-circular racks 20 are pinions 21—21 mounted at the opposite ends of a suitable transverse shaft 22 mounted in bearings 23—23 carried by the frame A. Also mounted on said shaft 22 is a worm gear 24 with which coöperates a worm 25 carried by an operating shaft 26 mounted in other suitable bearings 27 carried by the frame A. The shaft 26 is provided with a hand wheel 28 at one end in a readily accessible position so that, by turning the hand wheel 28 it is evident that the tilting platform can be adjusted as desired through the worm, worm gear, pinions and racks. Furthermore, this operating gearing is such that it is self-locking and will automatically hold the platform in any position to which it is moved.

In order to facilitate pulling the automobile onto the platform B, I preferably employ a suitable tackle and winch which, as shown, includes a winding drum 29 rotatably mounted in bearings 30—30 carried by the frame, said drum 29 having a crank arm operating handle 31. Carried by the drum is a ratchet wheel 32 with which coöperates a gravity-controlled pivoted locking dog 33. A suitable cord or cable 34 is arranged to wind around the drum 29, said cable carrying a block and pulley 35 with a hook 36 thereon. The free end of the cable may be attached to any suitable part of the vehicle, as for instance, the rear axle, and the hook 36 engaged to some suitable part of the platform and the cable wound up on the drum 29 until the automobile is pulled up sufficiently onto the platform B.

In order to hold the automobile in place on the platform and prevent shifting of the automobile as the platform is tilted, I preferably employ four chocks 37—37 made of any suitable material and preferably having a curved section 38 to fit the corresponding wheels of the automobile and a horizontal leg 39 fitting the bottom of the channel tracks 17. To hold the chocks in position and permit adjustment thereof for automobiles having different wheel base lengths, said chocks are preferably provided with integral or rigidly attached bolts 40 adapted to extend through elongated slots 41 formed in the bottoms of the channels 17, there being nuts 42 coöperable with the bolts on the under side of the channels so as to secure said chocks in any desired position.

In actual practice, the shaft or axle of the platform B will be located at such a height as to permit the workman to stand comfortably within the frame A and with the upper part of his body extending through the platform when the latter is tilted so that the workman can work with maximum efficiency and minimum discomfort in getting at all of the parts of the automobile. Furthermore, it will be seen that the device is of the utmost simplicity, can be relatively cheaply manufactured, easily shifted or transported from one part of the garage or assembling plant to another and effects a great improvement over the present practices employed. I have herein described the rack as employed mostly in a garage but it will be evident to those skilled in the art that it would be of equal utility in assembling plants, paint shops and anywhere that requires workmen to get at the under side of an automobile or even where it is not necessary to get to the under side but where it is desired to elevate the automobile to such a level as to render the sides readily accessible without bending or stooping of the workmen.

I claim:

1. In a device of the character described, the combination with a supporting base adapted to be readily shifted from place to place on a floor, said base comprising an open framework adapted to permit a workman to stand therewithin; of supports extending upwardly from each side of said base substantially at the middle thereof; a platform pivotally supported substantially at its center on said supports and adapted to tilt either end thereof downwardly, said platform comprising side track elements and cross braces and open therebetween to permit a workman to stand therein, said track elements being elongated so that they are adapted to extend beyond the ends of the base substantially to the floor level when the platform is tilted to position to receive a vehicle thereon; and mechanism for tilting said platform in either direction, said mechanism including a manually operable element and gearing interposed therebetween and said platform adapted to automatically lock the platform in any adjusted position.

2. In a device of the character described, the combination with a supporting base adapted to be readily shifted from place to place on a floor, said base comprising an open framework adapted to permit a workman to stand therewithin; of supports extending upwardly from each side of said base substantially at the middle thereof; a platform pivotally supported substantially at its center on said supports and adapted to tilt either end thereof downwardly, said platform comprising side track elements and cross braces and open therebetween to permit a workman to stand therein, said track elements being elongated so that they are adapted to extend beyond the ends of the base substantially to the floor level when the platform is tilted to position to receive a vehicle thereon; mechanism for tilting said platform in either direction; and means for pulling a vehicle onto said platform while in tilted position, said means including a winding drum mounted on the base and a flexible connection adapted to be run from said drum to either end of the tilting platform.

3. In a device of the character described, the combination with a supporting base adapted to be readily shifted from place to place on a floor, said base comprising an open framework adapted to permit a workman to stand therewithin; of supports extending upwardly from each side of said base substantially at the middle thereof; a platform pivotally supported substantially at its center on said supports and adapted to tilt either end thereof downwardly, said platform comprising side track elements and cross braces and open therebetween to permit a workman to stand therein, said track elements being elongated so that they are adapted to extend beyond the ends of the base substantially to the floor level when the platform is tilted to position to receive a vehicle thereon; mechanism for tilting said platform in either direction, said mechanism including a depending segmental rack secured to the platform, a gear coöperable with said rack, a manually operable element and a worm and worm-gear interposed between said element and said gear, said gear, worm-gear, worm and element being supported on said base; and means for chocking a vehicle while in position on said platform.

In witness that I claim the foregoing I have hereunto subscribed my name this 23rd day of March 1918.

JOHN I. McFARLAND.

Witnesses:
W. J. WILSON,
HERBERT PALMER.